G. V. PORZ.
MEANS FOR DISPENSING ICE CREAM.
APPLICATION FILED SEPT. 15, 1919.
1,395,654.
Patented Nov. 1, 1921.
3 SHEETS—SHEET 1.
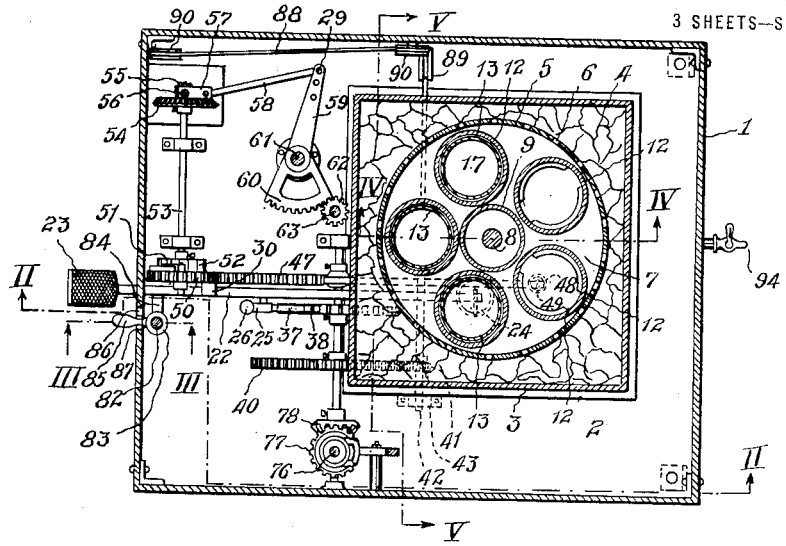
FIG. 1.
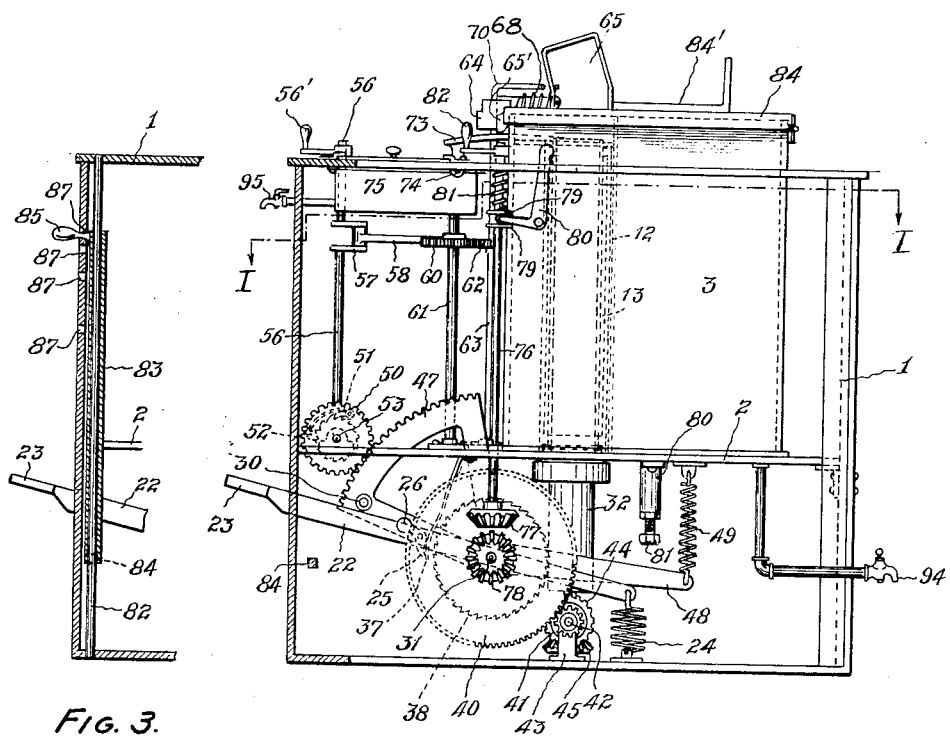
FIG. 3.
FIG. 2.
INVENTOR:
GEORGE V. PORZ
BY
Frease, Merkel and Saywell
ATTORNEYS

G. V. PORZ.
MEANS FOR DISPENSING ICE CREAM.
APPLICATION FILED SEPT. 15, 1919.

1,395,654.

Patented Nov. 1, 1921.
3 SHEETS—SHEET 2.

INVENTOR:
GEORGE V. PORZ
BY
Frease, Merkel & *Trumell*
ATTORNEYS

G. V. PORZ.
MEANS FOR DISPENSING ICE CREAM.
APPLICATION FILED SEPT. 15, 1919.

1,395,654.

Patented Nov. 1, 1921.
3 SHEETS—SHEET 3.

INVENTOR:
GEORGE V. PORZ
BY
Freass, Merkel & Saywell
ATTORNEYS

UNITED STATES PATENT OFFICE.

GEORGE V. PORZ, OF CLEVELAND, OHIO.

MEANS FOR DISPENSING ICE-CREAM.

1,395,654.  Specification of Letters Patent.  Patented Nov. 1, 1921.

Application filed September 15, 1919. Serial No. 323,790.

*To all whom it may concern:*

Be it known that I, GEORGE V. PORZ, a citizen of the United States, resident of Cleveland, county of Cuyahoga, and State of Ohio, have invented new and useful Improvements in Means for Dispensing Ice-Cream, of which the following is a specification, the principle of the invention being herein explained and the best mode in which I have contemplated applying that principle, so as to distinguish it from other inventions.

My invention relates to means for dispensing ice cream and particularly to means of this character adapted for use in retail trade. It is designed by the invention to provide such means in which the cream may be handled in a very sanitary manner; means which may be operated easily and effectively and will not readily go out of commission; and means which shall dispense the cream accurately in predetermined and desired amounts.

The annexed drawings and the following description set forth in detail certain means embodying my invention, the disclosed means, however, constituting but one of the various mechanical forms in which the principle of the invention may be employed.

In said annexed drawings:

Figure 1 represents a horizontal section, taken in the planes indicated by the lines I—I, Fig. 2;

Fig. 2 represents a vertical section, taken in the planes indicated by the lines II—II, Fig. 1;

Fig. 3 represents a longitudinal vertical section, taken in the plane indicated by the line III—III, Fig. 1;

Figure 4:
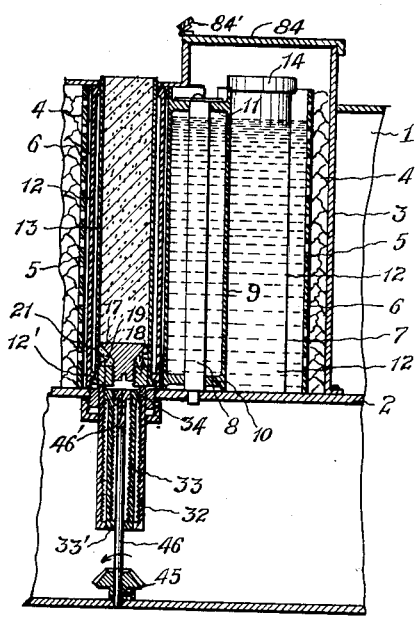
Fig. 4 represents a longitudinal vertical section, taken in the plane indicated by the lines IV—IV, Figs. 1 and 5.
Figure 5:
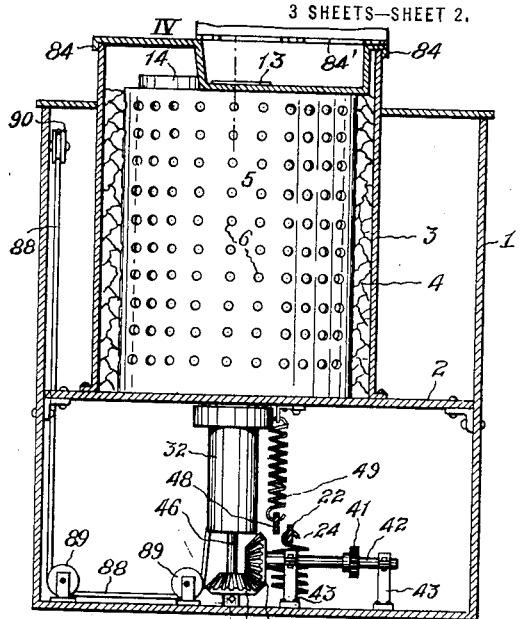
Fig. 5 represents a transverse vertical section, taken in the planes indicated by the lines V—V, Fig. 1.
Figures 8, 9:
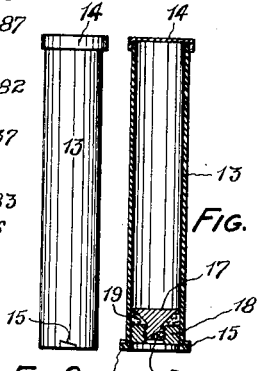
Figs. 8, 9 and 10, represent, respectively, an elevation, a central longitudinal section, and a bottom plan of one of a plurality of cream containers hereinafter fully described.
Figure 10:
Figures 7, 11, 12, 13:
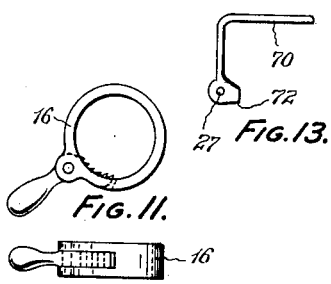
Fig. 7 represents a longitudinal vertical section, somewhat enlarged, taken in the planes indicated by the lines VII—VII, Fig. 14.
Figs. 11 and 12 represent, respectively, a plan and a side elevation of a special tool for turning the cream containers shown in Figs. 8, 9 and 10.
Fig. 13 represents an elevation of an element, hereinafter fully described, adapted to tip a frame carrying a cutting knife, during the forward movement of the frame, whereby the latter may be caused to intercept the severed portion of cream and convey the same to a predetermined dispensing position.
Figures 16, 17:
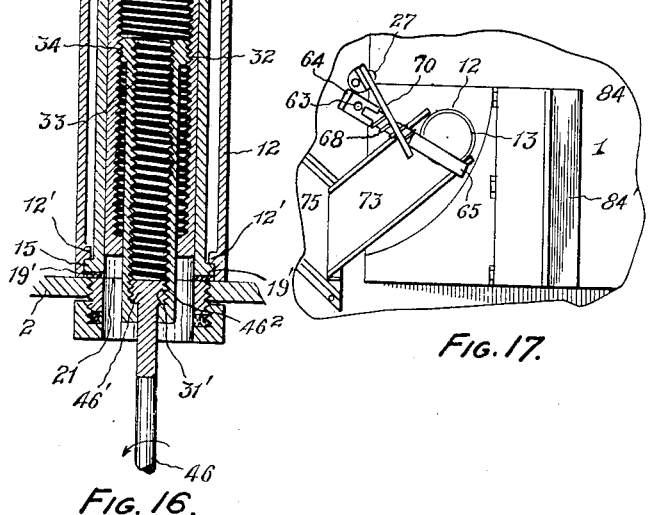
Fig. 16 represents an enlarged view of a fragmentary portion of the elements shown in Fig. 4, after a certain telescoping screw, hereinafter fully described, has been actuated through a portion of its forward movement.
Figs. 17 and 18 represent fragmentary plan views of the elements shown in Fig. 14 in the respective positions they occupy when the cream cutting motion has been completed and the frame has just commenced to be tipped for scraping off the cream, and when the said frame has just commenced to actually scrape the cut cream into the dispensing chute.

Referring to the annexed drawings:

There is represented by the ordinal 1 a suitable main frame member, preferably rectangular in plan and constructed for the most part of angle irons. Intermediately of the top and bottom of this main frame is supported a shelf 2 upon which is mounted an open ended box or receptacle 3 preferably square in plan and formed of some non-rustable material. Mounted within this box 3 is a cylindrical screen or partition 5, the space between said screen 5 and the wall of the box 3 forming an ice chamber 4, and the space within said screen 5 forming a refrigerating or brine chamber 7. Said screen 5 is impervious to large pieces of ice but, by means of the apertures 6, allows for the free circulation of the brine within the chamber 7. Centrally mounted in the refrigerating chamber 7 is a post 8 contained within a cylindrical casing 9 formed with upper and lower bearing members 10 and 11 in which the post 8 is journaled. Soldered to the bearing members 10 and 11 or otherwise suitably secured thereto are a plurality of cylindrical ice cream containers 12, surrounding the casing 9 and contained within the brine chamber 7. These containers 12 are adapted to receive ice cream cans 13 which are plainly shown in Figs. 8, 9 and 10. These cans are provided with suitable covers 14, which are removed when the several cans are brought to the dispensing position in the manner hereinafter fully described. The cans 13 are formed at their lower ends with a pair of lateral lugs 15 which can be dropped through suitable apertures in shoulders 12' of the casings 12 and then the cans 13 turned by a suitable tool 16, such as shown in Figs. 11 and 12, to bring the lugs 15 under said shoulders 12' and thus lock the cans 13 within the casings 12. The cans 13 are formed with a central conical shaped member 17 at the bottom which, at its widest diameter, is approximately equal to the inner diameter of the can. Said member 17 is formed with a bottom portion of reduced cross-section having an external screw thread adapted to coöperate with a nut 18, also of substantially the inner diameter of the can 13. Disposed above the nut 18 and intermediately of the same and the large section of the member 17, is a leather gasket 19. By turning the member 17 through the medium of an aperture 20 adapted to receive a suitable tool such as a screw driver, said member 17 can be threaded down into the nut 18, thus compressing the leather gasket 19 and providing a very tight joint for the bottom of the can 13. Leakage of brine from the chamber 7 is prevented by the leather gaskets 19'. The members 17, 18 and 19 are designed to slide in the can 13 in the manner and for the purpose hereinafter fully described. It will be apparent from the foregoing description that the containers 12 and the cans 13 can be manually rotated about the central casing 9 and this design is for the purpose of bringing the casings 12 and cans 13 serially in registration with a hole 21 formed in the forward portion of the shelf 2. Also registering with the hole 21 and from beneath, is a vertically disposed shaft 46 formed with an enlarged external screw threaded head 46'. An internally threaded cylindrical shell 33 is adapted to register with said screw threaded head 46'. Said internally threaded shell 33 is formed with an enlarged externally threaded head 34 adapted to coöperate with an internally threaded outer shell 32. The external diameter of said shell 32 is substantially equal to the internal diameter of the casings 12. It is evident that the actuation of the shaft 46 in the direction indicated by the arrows in Figs. 4 and 16 will, in the position shown in Fig. 4, result in the upward movement of the shell 33 until the bearing member 33' thereof strikes the shoulder $46^2$ of the head 46'. This last-named position is shown in Fig. 16. The further actuation of the shaft 46 will then result through the coöperation of the head 46', internal and external screw threads 33 and 34, and the shell 32, in the upward movement of the shell 32. The action is, thus, that of a telescoping screw and the result is to force the cream contained in the can 13 upwardly. There will now be described means for actuating the shaft 46 periodically and by predetermined amounts.

Figure 6:
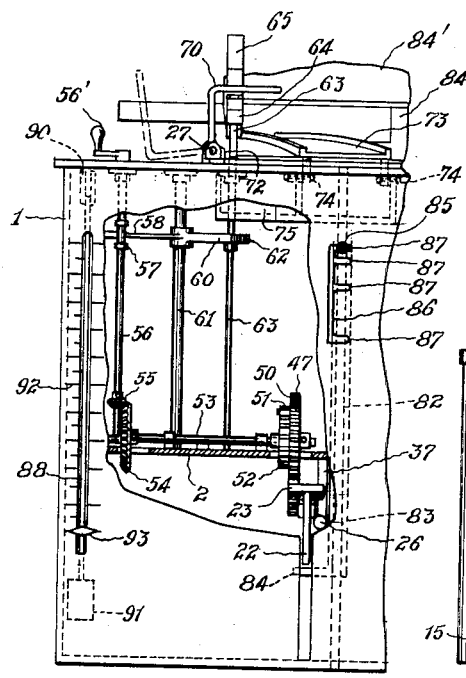
Fig. 6 represents a front elevation, with a portion of the front wall of the main frame broken away.

Mounted in the frame 1 is a shaft 31 upon which is pivoted a lever 22 having a tread member 23, a spring 24 being secured to the inner end of said lever, said spring being secured at its other end to the base of the frame 1. A pawl 25 is secured to the lever 22, a weight 26 being secured to the outer end of said pawl, so that the inner end of the same presses upon a plate 37 secured to the base of the shelf 2. Secured to the shaft 31 is a ratchet 38 and a gear wheel 40. The latter meshes with a pinion 41 secured to a shaft 42 mounted in standards 43. To the inner end of the shaft 42 is secured a bevel gear 44 meshing with a bevel gear 45 secured to the vertically disposed shaft 46 hereinbefore mentioned. It is evident that the downward movement of the treadle 23 will result in the actuation of the shaft 31 and the consequent actuation of the shaft 42 and the shaft 46 to feed the telescoping screw upwardly, when the pawl 25 has been lowered sufficiently to escape from the plate 37. The reason for thus delaying the action of the telescoping screw upon the cream contained in the cylinder 13, is that the cutting of the cream, which will be hereinafter described in detail, requires at least a certain minimum amount of movement of the shaft 31 and this necessary minimum amount may be greater than is required for the minimum amount of cream to be fed out of the cylinder 13. In other words, a five cent order of cream, for instance, may require a less movement of the shaft 31 than the movement of said shaft necessary to effect the cutting of said cream from the cylindrical block contained in the cylinder 13. How this cutting is effected and how it depends upon the movement of the shaft 31 in the reverse direction, will be hereinafter described in detail. The amount of cream fed from the container 13 will, of course, depend upon the extent to which the lever 22 is depressed, and this amount of movement is regulated by the following means:

It will be noted, in Figs. 1, 3 and 6, that there is a vertically disposed rod 82 upon which is slidably mounted a sleeve 83 having a laterally extended base member 84. There is also formed in the frame 1 a slot 86 and a vertical series of extended catches 87. The sleeve 83 is formed with a handle portion 85 and by means thereof it is possible to lift or lower the said sleeve and to turn the same upon the shaft 82 so as to rest the handle 85 upon any desired catch 87. This positions the base portion 84 at the desired level and this base portion lies in the pathway of the foot lever 22, so that the amount of possible downward actuation of said foot lever is controlled by the position of the base 84. In order that for any special purpose a greater amount of cream may be fed upwardly through the container 13 than is provided for by the setting of the stop 84, I have provided an upwardly extending shaft 76 formed with a bevel gear 77 at its bottom end, which gear is adapted to mesh with a second bevel gear 78 formed upon the outer end of the shaft 31. Secured to said vertically disposed shaft 76 are a pair of collars 79. One arm of a bell crank 80 extends around said shaft 76 between said collars and it is evident that the actuation of said bell crank 80 will result in the meshing or separation of the bevel gears 77 and 78, as desired. A spring 81 disposed between the upper collar 79 and the top of the main frame 1 tends to hold the gears 77 and 78 in mesh. When the operating end of the bell crank 80 is actuated to allow the spring 81 to bring the gears 77 and 78 into mesh, a handle 82 secured to the top of the vertically disposed movable shaft 76 can be actuated to turn the shaft 31, resulting in the feeding of the cream upwardly in the container 13 the desired additional amount. Also, it is evident that when the foot lever 22 is in the position illustrated in Fig. 2, the shaft 76 can be actuated in the reverse direction to lower the telescoping screw throughout the whole length of the container 13 and by one continuous movement.

Figure 14:
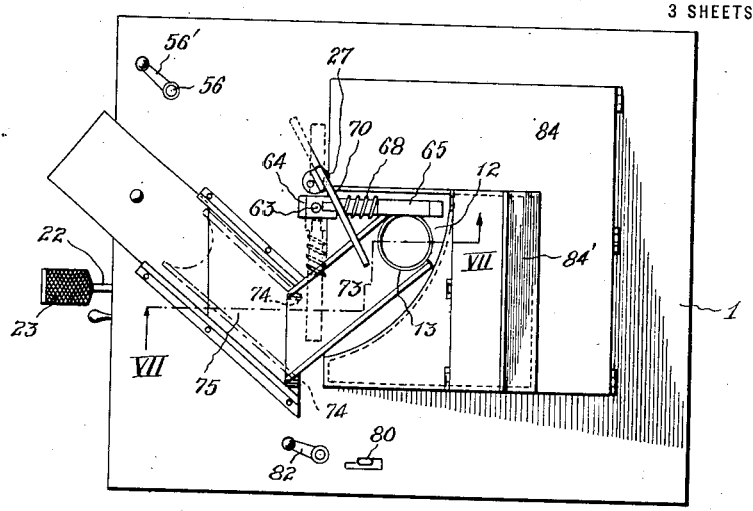
Fig. 14 represents a plan view of the machine as seen when ready for operation.
Figure 15:
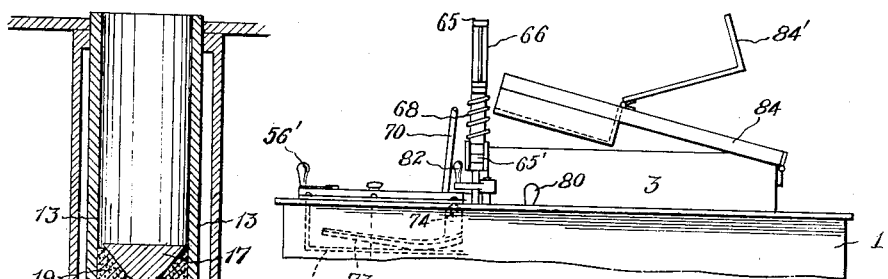
Fig. 15 represents a side elevation of the elements shown in Fig. 14 when the machine is not in operation.
Figure 18:
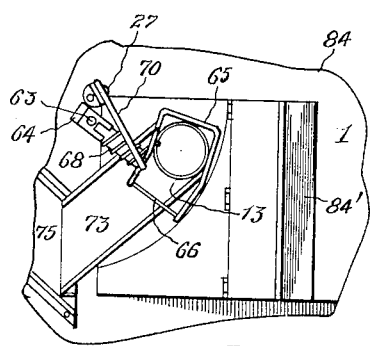

Also pivoted upon the shaft 31 is a gear segment 47 having an extended rear arm 48 to the outer end of which is secured a spring 49 whose other end is secured to the under surface of the shelf 2. The tendency of the spring 49 is therefore to lower the gear segment 47. There is secured to the segment 47, adjacent to the foot lever 22, a roller 30, so that the gear segment 47 is lowered, under the tension of the spring 49, an amount governed by the position of the foot lever 22. This gear segment 47 meshes with a pinion 50 mounted upon the horizontally disposed shaft 53. There is secured to the shaft 53 a ratchet 52 adapted to coöperate with a pawl 51 secured to the pinion 50, the arrangement being such that the pawl plays idly over the ratchet during the downward movement of the gear segment 47. Secured to the other end of the shaft 53 is a bevel gear 54 adapted to coöperate with a bevel pinion 55 secured to the lower end of a vertically disposed shaft 56. The shaft 56 is formed with a crank portion 57, the connecting rod 58 secured to which is adjustably secured by means of pins 29 to an arm 59 pivotally mounted upon a shaft 61 and formed at its other end with a gear segment 60 adapted to mesh with a pinion 62 secured to a vertically disposed shaft 63. To the top of the shaft 63 is secured a support 64 for a frame 65. This frame 65 is pivotally supported by means of a pin 69 and consists of the frame proper 65 and a laterally extending arm 65'. The frame proper 65 is pivotally connected to the arm 65' by means of a pin and screw 28 and said frame 65 is held normally in a vertical position, such as is illustrated in Fig. 7, by means of a torsion spring 68 secured at one end to said arm 65' and bearing at its other end against the tiltable frame 65. The whole frame consisting of the members 65 and 65' can be manually tilted back upon the pin 69 as an axis, as is shown in dotted lines in Fig. 7. It is evident that the rotation of the shaft 63, due to the action of the members 47, 53, 51 and 52, will result in the movement of the frame 65 in horizontal planes, and the arrangement is such that this path of movement of the frame 65 is intersected by the cream which has been forced out of the container 13, the frame 65 lying back of this cream after it has thus been forced from the container. Secured to the forward end of the frame 65 is a cutting member 66, the same being, in the form of device shown, a cutting wire. Upon the actuation of the shaft 63, this wire 66 cuts through the extending portion of cream, severing the same from the body of cream contained in the cylinder 13. This is illustrated in Fig. 17. When this cutting action takes place, the frame 65 is vertically disposed as shown in Fig. 7. An angle bar 70, shown in Fig. 13, lies in the pathway of the tiltable frame 65, so that just as soon as the cutting of the cream is completed, the frame 65 encounters the arm 70 and is tilted upon the pin 28 as an axis, into the position shown in Fig. 18. This causes the broad base of the frame 65 to encounter the severed portion of cream and to scrape the same, during the continued rotation of the shaft 63, into a dispensing chute 73, whence it is delivered to the purchaser. The chute 73 is of the design plainly shown in Figs. 6, 14, 17 and 18 and is pivotally mounted upon a pin 74. The forward end of the chute is so formed and disposed as to provide means for properly registering the containers 13 when they are serially fed into registration with the opening 21 formed in the shelf 2. In other words, the containers 13, when turned into the proper position, are received and encircled by the curved front portion of the chute 73, as plainly shown in Figs. 14, 17 and 18. When the operation of the machine is temporarily discontinued, the chute 73 is swung upon the pin 74 into the position plainly shown in dotted lines in Fig. 15, a tank being indicated by the ordinal 75 adapted to contain water and in which the slide 73 is submerged for purposes of sanitation. In order that this action may take place, and also that a cover 84 and an auxiliary cover 84' may be closed, the arm 70 is pivotally secured by means of a pin 27 upon the main frame 1 and is swung back out of position, as plainly illustrated in Fig. 14 in dotted lines. The forward actuation of the arm 70 is prevented by means of a lug 72 formed upon the lower end of said arm and acting as a stop, since it rests upon the top of the main frame 1. In order that the cutting mechanism may be manually operated, if desirable or necessary, I have secured to the top of the crank shaft 56 an operating lever 56'.

In order that the amount of cream left in the container 13 may always be apparent to the operator, I have provided a cable 88, plainly shown in Fig. 6, running over a pair of upper pulleys 90, whence it runs down under a pair of lower pulleys 89 and is secured to the outer member 32 of the telescoping screw. The outer free end of the cable 89 is provided with a weight 91 and the cable registers with a scale 92. It is evident that a pointer 93 secured to the cable will register exactly on the scale 92 the height of the screw in the container 12.

It will be apparent that the work required of the cutting member 66 will be the same whether the amount of cream forced from the can 12 is a large portion or a small portion. Therefore, I provide means for limiting the amount of movement of the ratchet 52 upon the return movement of the lever 22. This is effected by means of a post 80 secured to the floor of the shelf 2 and in the bottom of which engages an adjustable screw 81. This screw lies in the pathway of the member 48. Therefore, the setting of the screw 81 will limit the downward movement of the gear segment 47 and hence the amount of its return movement, which return movement governs the action of the cutting blade 66.

I have provided suitable drains 94 and 95 for the ice chamber 4 and the slide chamber 75, respectively.

What I claim is:

1. In means for dispensing ice cream, the combination with a vertically disposed ice cream container; means for forcing a predetermined length of an ice cream block upward from said container; means adapted to vary the amount of ice cream forced from the container; means for severing from the ice cream block the expressed portion thereof; and automatically operated means pivotally connected at the top portion of said container for removing the cut portion and conveying the same to a predetermined position.

2. In means for dispensing ice cream, the combination with a vertically disposed ice cream container; means for forcing a predetermined length of an ice cream block upward from said container; means adapted to vary and regulate the amount of ice cream forced from the container; means for severing from the ice cream block the expressed portion thereof; common means for actuating said cream-forcing automatically operated means and said cutting means; and means connected at the top portion of said container for removing the cut portion and conveying the same to a predetermined position.

3. In means for cutting ice cream, a vertically disposed ice cream container, a frame pivotally mounted at the top of said container, a vertically disposed shaft adapted to carry said frame and reciprocate same in a horizontal plane, and a cutting blade secured to the forward end of the frame, said frame being automatically actuated for removing the cut portion and conveying it to a predetermined position.

4. In means for dispensing ice cream, a cream reservoir comprising, means forming a refrigerating chamber, a vertically disposed cylindrical casing within said chamber; a vertically disposed post within said casing; upper and lower bearing members in which the post is journaled; a series of cream containers vertically disposed around said post, said containers adapted to be manually rotated about said pillar, and an aperture formed in the floor of said chamber and adjacently to which said containers are rotated serially.

5. In means for dispensing ice cream, the combination of a main frame; a foot lever pivoted therein; means tending to hold said lever in an inoperative position; a telescoping screw actuated by the forward movement of said lever, said screw provided with a push-plate; a cream container through which said screw is movable, said screw being unaffected by the return movements of said foot lever; means for retracting said screw; means for varying the amount of cream forced from the container and means for severing the cream portion expressed from said container by said screw.

6. In means for dispensing ice cream, the combination of a main frame; a foot lever pivoted therein; a spring secured to the floor of said frame and to the inner end of said lever; a pawl secured to said lever; a ratchet mounted in said frame and adapted to be actuated by the pawl upon the forward movement of the lever; a telescoping screw adapted to be actuated by said ratchet; a cream container through which said screw is movable; means for varying the upward movement of said screw within the container; means for retracting said screw throughout the whole length of said cream container in one continuous movement; and means actuated by the return movements of the lever and adapted to sever the cream portions expressed from said container by the successive forward movements of the screw.

7. In means for dispensing ice cream, the combination of a main frame; a foot lever pivoted therein; a spring secured to the floor of said frame and to the inner end of said lever; a pawl secured to said lever; a ratchet mounted in said frame and adapted to be actuated by the pawl upon the forward movement of the lever; a telescoping screw adapted to be actuated by said ratchet; a cream container through which said screw is movable; means for varying the actuation of said screw; manually-operable transmission members for retracting said screw; and means for cutting the cream portions expressed from the container by the successive forward movements of the screw and including a ratchet and pawl brought into operative engagement during the return movements of the foot lever and held out of engagement during the forward movements of the foot lever.

8. In means for dispensing ice cream, the combination of a main frame; a foot lever pivoted therein; means tending to hold said lever in an inoperative position; a telescoping screw actuated by the forward movement of said lever, said screw provided with a push-plate; means adapted to vary and control the movement of said screw; means adapted to prevent the actuation of said screw during a portion of the forward movement of said lever; a cream container through which said screw is movable, said screw being unaffected by the return movements of said foot lever; means for retracting said screw; and means for severing the cream portion expressed from said container by said screw.

9. In means for dispensing ice cream, the combination of a main frame; a foot lever pivoted therein; means tending to hold said lever in an inoperative position; a telescoping screw actuated by the forward movement of said lever, said screw provided with a push-plate; means for varying and regulating the upward movement of the screw; means adapted to prevent the actuation of said screw during a portion of the forward movement of said lever; a cream container through which said screw is movable, said screw being unaffected by the return movements of said foot lever; means for retracting said screw; means actuated by the return movements of the lever and adapted to sever the cream portions expressed from said container by the successive forward movements of the screw; and means limiting the actuation of the cream-cutting means to a part only of the return movement of the lever.

10. In means for dispensing ice cream, the combination of a main frame; a foot lever pivoted therein; a spring secured to the floor of said frame and to the inner end of said lever; a pawl secured to said lever; a ratchet mounted in said frame and adapted to be actuated by the pawl upon the forward movement of the lever; a telescoping screw adapted to be actuated by said ratchet; means adapted to vary and regulate the actuation of said screw; a cream container through which said screw is movable; manually-operable transmission members for retracting said screw; means for cutting the cream portions expressed from the container by the successive forward movements of the foot lever; means limiting the engagement of said ratchet and pawl to a part only of the return movement of the lever; and manually-operable means for actuating said cutting means.

11. In means for dispensing ice cream, a cream reservoir, means forming a refrigerating chamber, a cylindrical casing within said chamber, a cylindrical vertically disposed post centrally mounted in said casing, a series of cylindrical cream containers surrounding said post, vertically disposed means for forcing cream from said container, and means for varying and regulating the amount of cream forced from the containers.

Signed by me, this 5th day of September, 1919.

GEORGE V. PORZ.